(12) United States Patent
Haslam et al.

(10) Patent No.: US 9,706,273 B2
(45) Date of Patent: Jul. 11, 2017

(54) METHOD FOR AUTO-CONFIGURATION OF A WAVELENGTH SELECTIVE SWITCH IN AN OPTICAL NETWORK

(71) Applicant: Lumentum Operations LLC, Milpitas, CA (US)

(72) Inventors: Thomas Haslam, Ottawa (CA); David Coomber, Nepean (CA); Daniel Doliska, Ottawa (CA); Michael Scott Pegrum, Nepean (CA); Marc-Antoine Boutin, Ottawa (CA); Brian Sungwan Kim, Ottawa (CA)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 14/608,228

(22) Filed: Jan. 29, 2015

(65) Prior Publication Data

US 2015/0139643 A1 May 21, 2015

Related U.S. Application Data

(63) Continuation of application No. 12/714,600, filed on Mar. 1, 2010, now Pat. No. 8,948,592.

(Continued)

(51) Int. Cl.
*H04Q 11/00* (2006.01)
*H04J 14/02* (2006.01)

(52) U.S. Cl.
CPC ...... *H04Q 11/0005* (2013.01); *H04J 14/0201* (2013.01); *H04J 14/0212* (2013.01);

(Continued)

(58) Field of Classification Search
CPC .... H04J 14/0212; H04J 14/0213; H04J 14/02; H04J 14/0217; H04J 14/0227; H04J 14/0205; H04Q 11/0005

(Continued)

(56) References Cited

U.S. PATENT DOCUMENTS

| 5,539,559 A | * | 7/1996 | Cisneros | ............. H04L 12/5601 370/414 |
| 6,487,334 B2 | | 11/2002 | Ducellier et al. ............... 385/22 |

(Continued)

OTHER PUBLICATIONS

In Hargrave's Communications Dictionary, Wiley, "Blocking", http://www.credoreference.com/entry/hargravecomms/blocking, 2001, 3 pages.

*Primary Examiner* — David Payne
*Assistant Examiner* — Tanya Motsinger
(74) *Attorney, Agent, or Firm* — Harrity & Harrity, LLP

(57) ABSTRACT

The invention relates to a method for auto-configuring a wavelength selective switch (WSS) device having an output port and a plurality of input ports and coupled to a WSS controller. When connected to a WDM optical network, the WSS controller is programmed to utilize one or more optical channel monitors (OCM) coupled to the input and/or output ports to detect which of the wavelengths are present at the input ports. Wavelengths that are not detected on any input port are blocked by the WSS. Any wavelength detected as present at one and only one input port is switched by the WSS to the output port. If a wavelength is detected at two or more input ports, it is either blocked by the WSS at each of the input ports until user intervention, or is blocked at all but one of the input ports as defined by assigned port priorities.

20 Claims, 9 Drawing Sheets

Related U.S. Application Data

(60) Provisional application No. 61/155,979, filed on Feb. 27, 2009.

(52) U.S. Cl.
CPC ....... *H04J 14/0204* (2013.01); *H04J 14/0206* (2013.01); *H04Q 2011/0037* (2013.01)

(58) Field of Classification Search
USPC .............. 398/48, 167.5, 43, 79, 83
See application file for complete search history.

(56) References Cited

U.S. PATENT DOCUMENTS

| | | | |
|---|---|---|---|
| 6,498,872 B2 | 12/2002 | Bouevitch et al. ............ 385/24 |
| 6,549,699 B2* | 4/2003 | Belser ................. G02B 6/2931 |
| | | | 385/24 |
| 6,625,346 B2 | 9/2003 | Wilde | |
| 6,661,948 B2 | 12/2003 | Wilde ............................. 385/24 |
| 6,687,431 B2 | 2/2004 | Chen et al. .................... 385/24 |
| 6,707,959 B2 | 3/2004 | Ducellier et al. .............. 385/17 |
| 6,760,511 B2 | 7/2004 | Garrett et al. ................. 385/24 |
| 6,771,905 B1* | 8/2004 | Bortz ...................... H04J 14/02 |
| | | | 398/45 |
| 6,819,940 B1 | 11/2004 | Kosaki | |
| 7,027,684 B2 | 4/2006 | Ducellier et al. .............. 385/24 |
| 7,039,267 B2 | 5/2006 | Ducellier et al. .............. 385/17 |
| 7,085,492 B2 | 8/2006 | Ibsen et al. | |
| 7,130,541 B2 | 10/2006 | Farmer et al. | |
| 7,212,704 B2 | 5/2007 | Ducellier et al. .............. 385/16 |
| 7,236,660 B2 | 6/2007 | Ducellier et al. .............. 385/24 |
| 7,254,327 B1* | 8/2007 | Zhong ................. H04B 10/0775 |
| | | | 398/33 |
| 7,263,253 B2* | 8/2007 | Davis ................. G02B 6/29311 |
| | | | 385/140 |
| 7,277,608 B2* | 10/2007 | Isomura ........... H04B 10/25073 |
| | | | 385/24 |
| 7,302,134 B2 | 11/2007 | Ducellier ....................... 385/24 |
| 7,366,370 B2 | 4/2008 | Goodwill et al. | |
| 7,529,441 B2 | 5/2009 | Helkey et al. | |
| 7,606,492 B2 | 10/2009 | Farmer et al. | |
| 7,653,311 B2 | 1/2010 | Kikuchi et al. ................. 398/83 |
| 7,715,711 B2 | 5/2010 | Gumaste | |
| 7,734,174 B2* | 6/2010 | Beckett ............... H04J 14/0206 |
| | | | 398/32 |
| 7,865,079 B2 | 1/2011 | Duggan et al. | |
| 8,233,794 B2 | 7/2012 | Colbourne et al. | |
| 8,401,348 B2* | 3/2013 | Boduch ............... H04J 14/0204 |
| | | | 385/16 |
| 8,401,386 B2* | 3/2013 | Izumi ..................... H04J 14/02 |
| | | | 398/33 |
| 8,682,167 B2* | 3/2014 | Kobayashi .......... H04J 14/0204 |
| | | | 398/83 |
| 8,861,402 B2 | 10/2014 | Testa et al. | |
| 8,948,592 B2* | 2/2015 | Haslam ............... H04J 14/0201 |
| | | | 398/48 |
| 9,078,054 B2 | 7/2015 | Ooki | |
| 9,143,846 B2 | 9/2015 | Kikuchi | |
| 9,274,284 B2* | 3/2016 | Komiya ................ G02B 6/3518 |
| 9,432,113 B2 | 8/2016 | Oi et al. | |
| 2002/0089725 A1* | 7/2002 | Farmer ................. H04J 14/028 |
| | | | 398/167.5 |
| 2002/0131687 A1* | 9/2002 | Wilde .................. G02B 6/2931 |
| | | | 385/24 |
| 2003/0039003 A1* | 2/2003 | Jakobik ............... H04J 14/0209 |
| | | | 398/43 |
| 2003/0067645 A1* | 4/2003 | Ibsen ......................... G01J 3/02 |
| | | | 398/79 |
| 2006/0039705 A1* | 2/2006 | Goodwill ............. H04B 10/801 |
| | | | 398/164 |
| 2006/0228072 A1* | 10/2006 | Davis ................. G02B 6/29311 |
| | | | 385/18 |
| 2007/0014513 A1* | 1/2007 | Isomura ........... H04B 10/25073 |
| | | | 385/24 |
| 2007/0077069 A1* | 4/2007 | Farmer ............... H04J 14/0226 |
| | | | 398/72 |
| 2007/0237451 A1* | 10/2007 | Colbourne ......... G02B 6/12007 |
| | | | 385/18 |
| 2007/0274724 A1* | 11/2007 | Gumaste ............. H04J 14/0212 |
| | | | 398/83 |
| 2008/0101743 A1* | 5/2008 | Duggan ............... H04Q 11/0005 |
| | | | 385/2 |
| 2008/0193127 A1 | 8/2008 | Beckett et al. | |
| 2009/0162067 A1* | 6/2009 | Kobayashi .......... H04J 14/0204 |
| | | | 398/79 |
| 2010/0061727 A1* | 3/2010 | Colbourne .......... H04J 14/0206 |
| | | | 398/48 |
| 2010/0221004 A1* | 9/2010 | Haslam ............... H04J 14/0201 |
| | | | 398/49 |
| 2010/0260499 A1* | 10/2010 | Izumi ..................... H04J 14/02 |
| | | | 398/48 |
| 2012/0170930 A1* | 7/2012 | Komiya ................ G02B 6/3546 |
| | | | 398/34 |
| 2012/0250580 A1* | 10/2012 | Testa ................... H04J 14/0201 |
| | | | 370/254 |
| 2014/0105601 A1* | 4/2014 | Ooki ................... H04Q 11/0005 |
| | | | 398/48 |
| 2014/0286637 A1* | 9/2014 | Kikuchi ............... H04J 14/0212 |
| | | | 398/48 |
| 2015/0098696 A1* | 4/2015 | Oi ....................... H04J 14/0221 |
| | | | 398/38 |

\* cited by examiner

METHOD FOR AUTO-CONFIGURATION OF A WAVELENGTH SELECTIVE SWITCH IN AN OPTICAL NETWORK

CROSS-REFERENCE TO RELATED APPLICATIONS

The present invention is a continuation of and claims priority to U.S. patent application Ser. No. 12/714,600, filed Mar. 1, 2010, entitled "Method for Auto-Configuration of a Wavelength Selective Switch in an Optical Network", and in turn claims priority from U.S. Provisional Patent Application No. 61/155,979 filed Feb. 27, 2009, entitled "Method of Self-Configuring a Controlled WSS or a ROADM device", which are incorporated herein by reference for all purposes.

TECHNICAL FIELD

The present invention relates generally to wavelength multiplexed optical communication systems and methods, and more particularly relates to methods of operating wavelength selective switches in such networks.

BACKGROUND OF THE INVENTION

Modern optical communication networks conveniently employ multi-channel wavelength-multiplexed optical signals. Such signals are comprised of a plurality of spectral channels, each having a distinct center wavelength and an associated bandwidth. The center wavelengths of adjacent channels are spaced at a predetermined wavelength or frequency interval, and the plurality of spectral channels may be wavelength division multiplexed (WDM) to form a composite multi-channel, or WDM, signal of the optical network. Each spectral channel, also referred to herein as the wavelength channel or simply the wavelength, is capable of carrying separate and independent information. At optical switching nodes in the optical network, one or more spectral channels may be dropped from or added to the WDM optical signal, as by using, for example, a reconfigurable optical add-drop multiplexer (ROADM).

A ROADM at the optical switching node may be constructed using one or more wavelength selective switches (WSS) configured as ADD and/or DROP modules. Wavelength selective switching in telecommunications networks is a relatively new technology that enables agility at the physical, i.e. optical, layer of the network. It allows wavelengths carrying data of any protocol or at any rate to be quickly and dynamically re-directed through networks to accommodate changes in demand for bandwidth, or changes in network topology, such as due to addition of new nodes to the network, addition of new wavelengths or services to the network, failures of links or nodes within the network, etc. Examples of WSS and ROADM devices are disclosed in U.S. Pat. Nos. 6,487,334; 6,498,872; 6,549,699, 6,625,346, 6,661,948, 6,687,431, 6,760,511 6,707,959; 7,039,267; 7,027,684; 7,302,134; 7,236,660; 7,212,704, which are incorporated herein by reference.

WSS technology that is available today supports switching of 80 or more channels through a single device, with the port count of a typical WSS being between typcially 3 and 10 or even greater. One type of WSS devices conveniently used today has one 'common' port, while all others are 'add/drop' ports, where each supported wavelength can be routed between the common port and any one, and typically only one, of the add/drop ports, or 'blocked' entirely (i.e., highly attenuated). However, this or similar technology could be extended to support much greater numbers of wavelengths and ports, or to support the ability to route wavelengths between any two ports. Note that WSSs are typically bi-directional in nature. That is, once the path for a given wavelength through the WSS has been configured from one port to another, modulated or unmodulated light of that wavelength can propagate in either direction between the two ports.

Advantageously, WSS technology enables reconfiguration of wavelength paths through networks using software control, without the need for technicians to change physical connections between devices in the network, such as to change optical fibre connections between fixed optical multiplexer/demultiplexer devices at network nodes where wavelengths are being added to or dropped from the optical network. However, despite the existence of the ability to perform wavelength reconfiguration remotely, control of telecommunications networks today still often relies on human intervention to determine the optimal wavelength configuration, and then to implement or initiate the desired change.

Human intervention may be particularly intense during deployment and commissioning of new WSS devices in a network, when operators must typically configure each supported wavelength. In some cases, network-level control software is used to reduce this burden by allowing the operator to configure a wavelength path through the entire network, and automating the configuration of individual WSS devices and ROADM nodes within the network.

However, this approach may also have certain disadvantages. In particular, smaller and simpler networks involving WSS/ROADM technology often don't warrant the increased cost and complexity of this network level control. Furthermore, network-level wavelength configuration approach necessitates having a computer or server that requires continuous software access to all nodes in the network in order to re-configure it. Furthermore, network operators may want to be able to introduce WSS or ROADM technology into existing networks without having to entirely change the method in which the network is managed, or to reconfigure the network management software at the control node.

Accordingly, a solution is desired that would enable to automate, or reduce the burden of, configuring WSS devices at the individual WSS device or network element (network node) level without the intervention, or in the absence of, network-level software of this kind An object of the present invention is to provide a means by which wavelength configuration in a network may be simplified and/or automated and, WSS devices in a WDM optical network may be automatically configured at the WSS device and/or network node level without the drawbacks of network-level wavelength control.

SUMMARY OF THE INVENTION

In accordance with the invention, there is provided a method for operating a wavelength selective switch (WSS) device in a wavelength division multiplexed (WDM) optical network, the WSS device having an output optical port and a plurality of input optical ports, and being coupled to a WSS controller for selectively provisioning optical connections between the input optical ports and the output optical port at one or more of a plurality of supported wavelengths. The method comprises: a) determining which of the supported wavelengths are received at each of the input ports using at least one optical channel monitor (OCM) coupled to the WSS device; and, b) using the WSS controller to selectively provision optical connections from respective input optical ports to the output optical port at those of the supported wavelengths that are received at a single input optical port of the WSS device, and to block connections between the input optical ports and the output optical port at those of the supported wavelengths that are not received at any of the input optical ports.

In accordance with one aspect of this invention, the method comprises the steps of: c) receiving, by the WSS controller, information from the at least one OCM which of the supported wavelengths are present at least one of the input optical ports; d) based on the information received from the at least one OCM, determining by the WSS controller which of the received wavelengths are present at one and only one of the input optical ports; and, e) at each of the wavelengths identified in step (d), provisioning by the WSS controller an optical connection in the WSS device between a corresponding input optical port and the output optical port.

Another aspect of the present invention provides a WSS device comprising a WSS element having an input port and a plurality of output ports for selectively switching any of a plurality of supported wavelength from any of the input ports to the output port or for blocking thereof, the WSS device further comprising a WSS controller coupled to the WSS element for controlling the switching, and further comprising one or more optical channel monitors coupled to the input and/or output ports of the WSS element and to the WSS controller, wherein the WSS controller is programmed to auto-configure the WSS element that is connected in an optical WDM network, by performing the steps of: co-operating with the one or more OCM to detect the presence of the supported wavelengths at each of the input ports; and, controlling the WSS element in such a way that i) any the supported wavelengths that is not detected by the OCM at any of the input ports is blocked by the WSS element from reaching the output port; ii) any wavelength whose presence is detected by the OCM at one and only one of the input ports is switched to the output port; and, iii) any supported wavelength whose presence is detected at more than one of the input ports is either blocked at each of the input ports until user intervention, or is blocked at all but one of the input ports and is directed to the output port from one of the input ports receiving said wavelengths which has a comparatively higher priority assigned thereto.

BRIEF DESCRIPTION OF THE DRAWINGS

The invention will be described in greater detail with reference to the accompanying drawings which represent preferred embodiments thereof, wherein.

DETAILED DESCRIPTION

One aspect of the current invention provides a means by which a controlled WSS device can automatically configure itself based on the detection of wavelengths, i.e. wavelength-multiplexed optical channels, present at one or more inputs into the device. In the following description, the operation of a WSS device will be considered in the context of a WDM optical network which supports a plurality of wavelength-multiplexed optical channels, which central wavelengths $\lambda_i$, i=1, ..., N, are typically spaced uniformly in frequency and lie on a pre-defined grid, for example corresponding to 50 GHz, 100 GHz or 200 GHz frequency spacing. However, it will be appreciated that the uniform in frequency spacing of the supported wavelengths channels is not a requirement for the present invention. In the context of this specification, we will be referring to the supported wavelength channels simply as the wavelengths, according to the channel central wavelengths $\lambda_i$, so that the presence of a wavelength at a port of an optical device is understood as the presence of an optical signal of a suitable strength which spectrum is centered at said wavelength. The number N of supported wavelengths in the network may be network-specific, with typical examples being 8, 10, 40 and 80.

Figure 1:
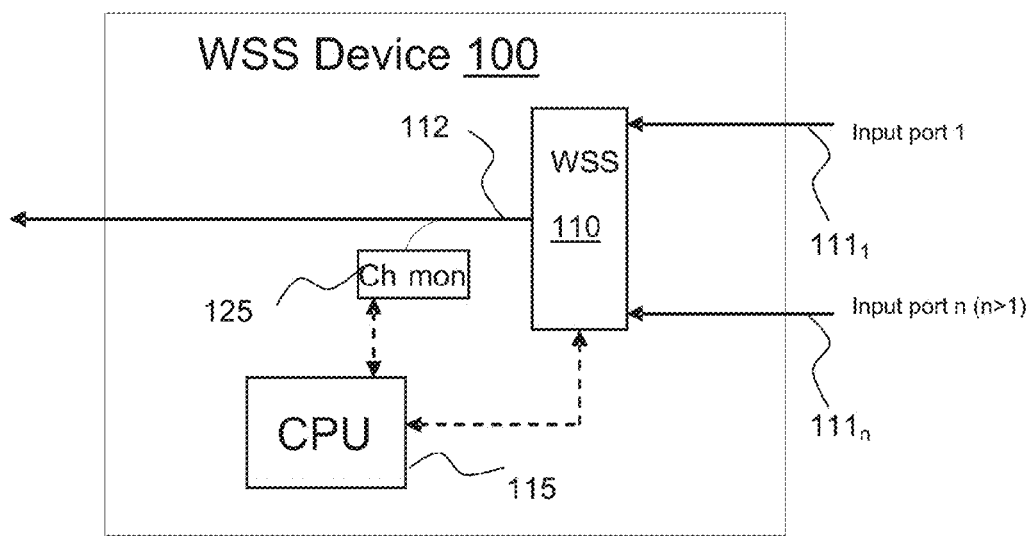
FIG. 1 is a block diagram of an exemplary controlled WSS device according to the present invention.

With reference to FIG. 1, an exemplary configuration of a controlled WSS, denoted as a WSS device 100, is illustrated. In the context of this specification, the term "wavelength selective switch", or WSS, is used to refer to a wavelength-switching element that is capable of selectively switching wavelengths from any number of input ports to one output port, and/or vice-versa. Many types of WSSs are known in the art, some of which are described in U.S. Pat. Nos. 6,487,334; 6,498,872; 6,707,959; 7,039,267; 7,027,684; 7,302,134; 7,236,660; 7,212,704, which are incorporated herein by reference. Typically, a WSS includes a dispersive element for separating light into constituent wavelengths or for combining multiple spatially dispersed wavelengths into a single output light beam, and an electrically controlled array of light manipulating elements such as a MEMS array or an LC cell array for attenuating or blocking dispersed light on a wavelength by wavelength basis. The term "Controlled WSS device" is used to mean a WSS that is controlled, for example, configured and monitored, by software or firmware running on a suitable controller or processor (CPU) that is connected to it. Configuring the WSS device includes configuring wavelength paths through the WSS device from the input ports to the output port, and may optionally include configuring of the optical output power of each wavelength. In the following, the term "WSS device" may be also used to refer to a controlled WSS device.

In the embodiment of FIG. 1, the controlled WSS device 100 includes a WSS element 110, which has an output optical port 112 and n>1 input optical ports 111₁ to 111ₙ, hereinafter generally referred to as the input ports 111. The WSS 110 has a control port and is operatively connected to a WSS controller 115, to receive control signals therefrom for selectively provisioning or blocking optical paths or connections between each of the input ports and the output port at any, or at least some, of the supported wavelengths individually. The h WSS controller 115 may be embodied using a suitably programmed microprocessor or the like, and is programmed or otherwise configured to generate signals for selectively provisioning optical connections between each of the input ports 111 and the output port 112 at any, or at least some, of the supported wavelengths $\lambda_i$, or blocking such connections at any of the wavelengths. The WSS controller 115 for controlling the operation of the WSS 110 may be physically located in the same module as the WSS 110, or it may be co-located on a printed circuit board assembly (PCBA) with the WSS element 110, as illustrated in FIG. 1; or it may be located on a separate PCBA that can communicate with the WSS element 110; or otherwise depending on application. In a preferred embodiment, the WSS controller 115 for controlling the operation of the WSS 110 is co-located with the WSS 110 at the same node.

The WSS device 100 also includes at least one optical channel monitor (OCM) 125, which is capable of monitoring the presence of supported wavelengths $\lambda_i$ at the input and/or output ports of the WSS 110, and in some embodiments is also capable of measuring the optical channel power at said wavelengths as known in the arts.

Figure 2:
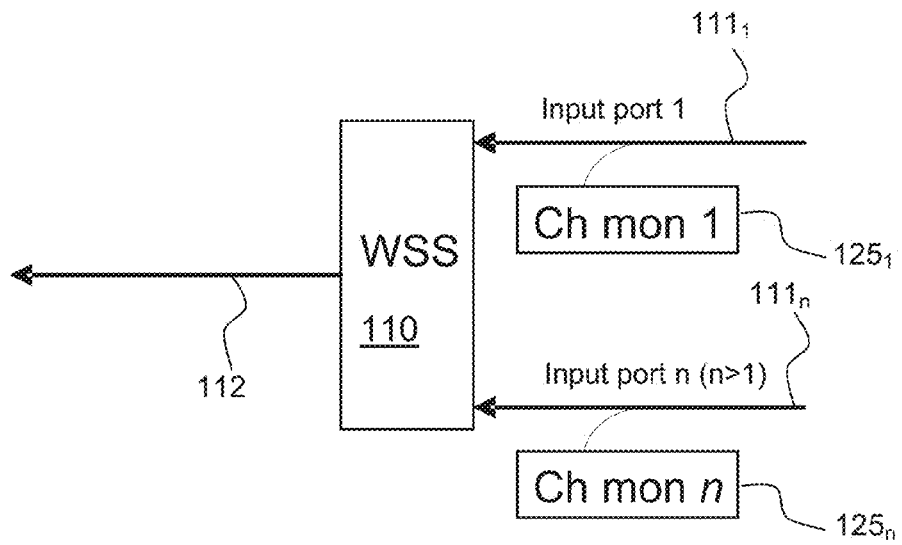
FIG. 2 is a block diagram of a WSS device having an optical channel monitor at each input port.

In the embodiment shown in FIG. 1, the OCM 125 is optically coupled at the output port 112 for monitoring the wavelength content of the WSS output, and is also operatively coupled to the WSS controller 115, which is programmed to collect results of the optical channel monitoring from the OPM 125. There are many technologies available for detecting channel presence on an optical fiber and suitable for utilizing the OCM 125, including but not limited to, a WDM de-multiplexer coupled to an array of photo detectors, an OSA-like device, etc; suitable OCMs utilizing these and other suitable technologies are well known and commercially available. Alternatively or concurrently, other OCMs 125₁-125ₙ may be coupled to each of the input ports 111 of the WSS 110 as illustrated in FIG. 2 to monitor the presence and, optionally, power of optical channels at the input ports 111 of the WSS 110.

Figure 3:
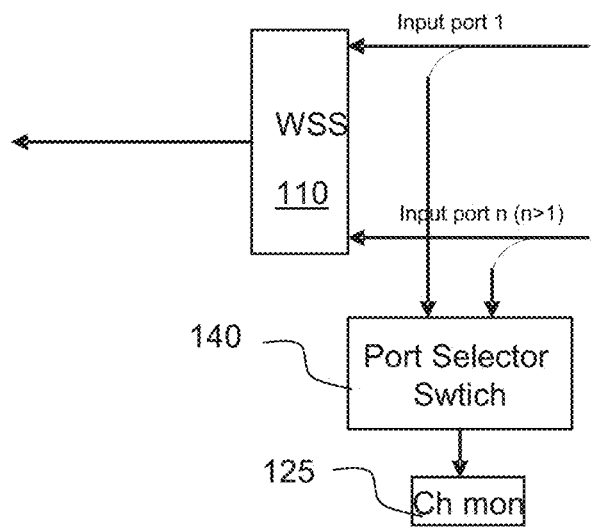
FIG. 3 is a block diagram of a WSS device having an optical channel monitor at each input port.

With reference to FIG. 3, in another embodiment the optical channel monitoring at the input ports 111 of the WSS 110 may be carried out using a single OPM 125 connected to the plurality of input ports 111 through a port selection switch 140, thereby enabling sequential monitoring of the wavelength content at each of the input ports 111. In this embodiment, the controller 115 (not shown in FIG. 3) is also operatively coupled to the port selector switch 140 for controlling thereof.

Figure 4:
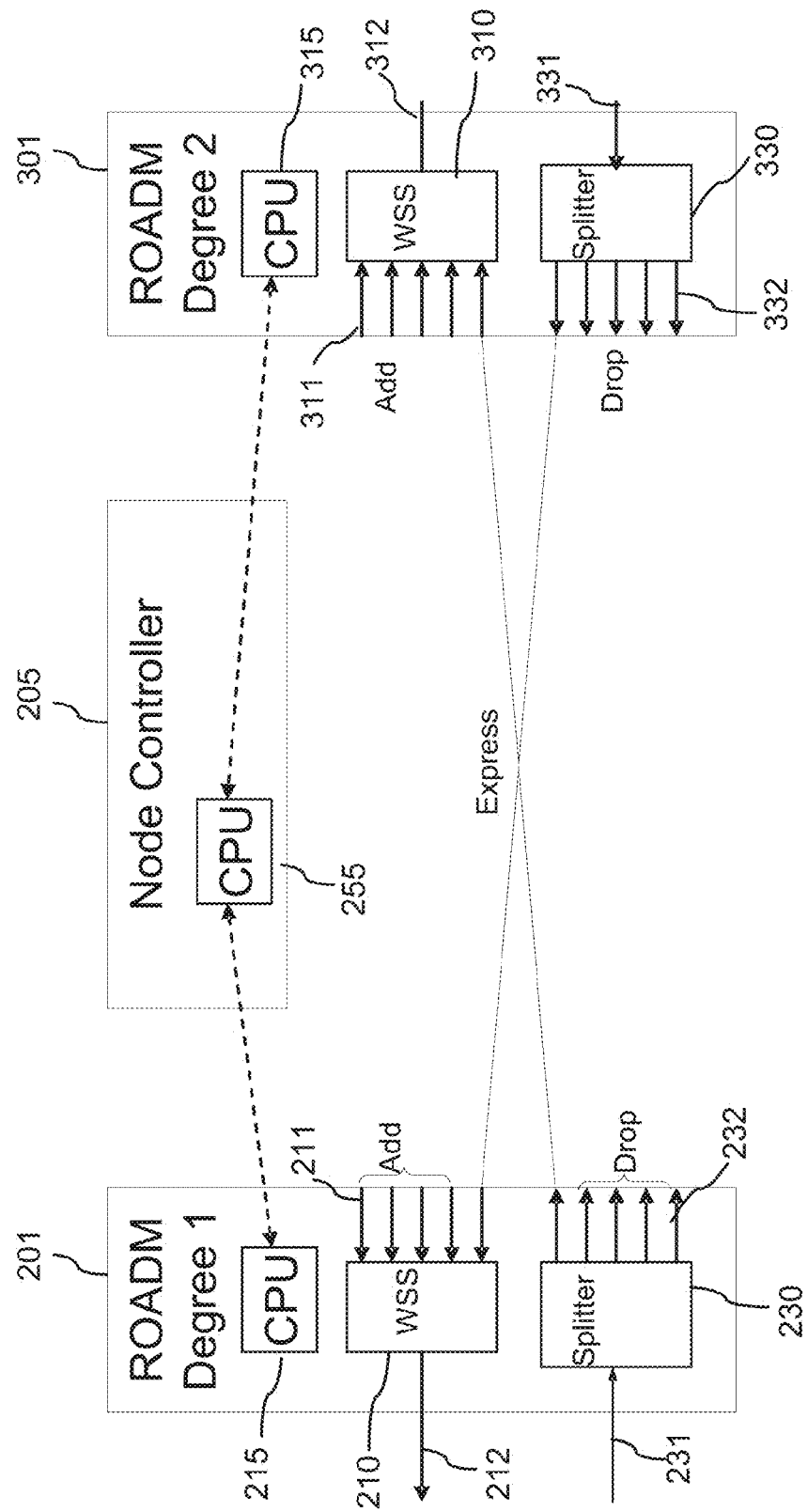
FIG. 4 is a block diagram of a WSS device having a single optical channel monitor connected to the input ports thereof with a port selector switch.

With reference to FIG. 4, there is schematically illustrated an exemplary two degree bidirectional node of a WDM optical network utilizing two controlled WSS devices. The node includes two reconfigurable optical add-drop modules (ROADM) 201 and 301, which enable selectively adding and dropping wavelength onto and from the network. Each of the ROADMs 201 and 301 includes an input passive optical splitter 230, 330, each of which having a single input port 231, 331 for receiving a WDM optical signal propagating in the network in a respective direction, and a plurality of output optical ports 232, 332; one of the output ports serves as an express output port, while one or more of the other output ports serving as drop ports, as indicated in FIG. 4. Each of the ROADMs 201 and 301 further includes an output controlled WSS device substantially similar to the controlled WSS device 100, and comprised of a WSS element 210, 310 coupled to a WSS controller 215, 315. Although not shown in FIG. 4, each of the controlled WSS devices of the ROADMs 201, 301 include one or more OCMs as illustrated in FIG. 1, 2, or 3 for monitoring the wavelengths at the inputs and/or the output of the respective WSS.

Each of the WSS 210, 310 has a single output port 212, 312 for launching a WDM optical signal from the node into the network in a respective direction of propagation. Each of the WSS 210, 310 further has a plurality of input optical ports 211, 311, with one of the input ports 211, 311 serving as an express input port, while one or more of the other input ports 211, 311 serving as add ports for adding wavelengths to the network, as indicated in FIG. 4. In each propagation direction, the express output port of a respective one of the splitters 230, 330 is connected to the express input port of a respective one of the WSS 310, 210. Considering by way of example the propagation of the WDM signal through the node in one of the propagation directions, for example, from left to right in FIG. 4, the WDM signal from the network is first received in the input optical port 231 of the splitter 230, which splits between the output ports 232, with each received wavelength present at each output port. Optical signals from the drop ports of the splitter 230 are then dropped from the network; for example, they may be de-multiplexed and then passed to a different local network and/or to end users, or converted to electrical signals as known in the art.

A portion of the input WDM signal is passed from the express output port of the splitter 230 onto the express input port of the WSS 310. Simultaneously, the WSS 310 may also be receiving other "add" optical signals at other input ports thereof designated as the "add" ports, for adding those "add" optical signals onto the network. The WSS operates to selectively and reconfigurably combine "express" wavelengths received from the splitter 230 with the "add" wavelengths received at the "add" input ports of the WSS 310. In doing so, the WSS 310 may also have to block from the "express" optical signal received at the express input port those of the wavelengths that were dropped at the splitter 230, in particular if the "add" optical signals at the "add" input ports 311 of the WSS 310 are carried by same wavelengths.

Accordingly, the WSS 310 has to be configured so as to provide optical connections from the input ports thereof to the output port at port-specific wavelengths, and to block some of the wavelength depending on network requirements. Generally, configuring a ROADM such as that illustrated in FIG. 4 requires configuring its constituent WSS devices, which includes configuring of wavelength paths through the device, and may also include the configuration of the optical output power of each wavelength at the output of the WSS device. Heretofore, configuring ROADMs and WSSs in optical networks has been performed, or suggested to be performed remotely from a central control node using sophisticated network control software operating over a control layer of the network.

The present invention provides a method for automated self-configuration of the WSS devices in an optical networks, and in particular at ROADM nodes of optical network. The method provides a means by which a controlled WSS device can automatically configure itself based on the detection of wavelengths (channels) present at one or more inputs into the device.

According to one aspect of the present invention, the WSS controller 115 (215, 315) is programmed to control and/or cooperate with the at least one OCM 125 to detect the presence of the supported wavelengths at each of the input ports 111 (211, 311 respectively), and to control the WSS 110 (210, 310) in such a way that i) wavelengths (channels) that are not detected by the respective OCM on any input port 111 (211, 311) are blocked by the WSS 110 (210, 310), ii) any wavelength whose presence is detected by the OCM at one and only one of the input ports 111 (211, 311) is switched to the common output port 112 (212, 312), and iii) any wavelength whose presence is detected at more than one of the input ports 111 (211, 311) is either blocked at each of the input ports until user intervention resolves the conflict, or is blocked at all but one of the input ports 111 (211, 311), and is connected to the output port from one of the input ports receiving said wavelengths which has a comparatively higher priority assigned thereto.

Except for possibly initiating it, the method requires no user interaction or external control, such as from software running on a processor that is external to the controlled WSS element, to complete the WSS configuration, and therefore simplifies and reduces the amount of user interaction required in order to configure the device. The method may be initiated by software command to the controller that is directly controlling the WSS, direct physical input from an operator, such as a pushbutton or switch, or any other means. The method requires the ability for the WSS controller in the controlled WSS device to monitor the presence of optical channels on each input port individually. Optionally, embodiments of the method may also provide a mechanism by which the output power of each channel is automatically adjusted. Channel powers may be adjusted in one of the following ways: to achieve a pre-determined power profile with respect to one another, including (but not limited to) a flat profile where all channels are output from the device with the same optical power level; and/or to achieve a pre-determined absolute power for each channel.

The adjustment of the channel power requires that the controlled WSS device supports, within the WSS element itself or otherwise, variable attenuation of optical power levels on a per-channel, or per-wavelength basis; one skilled in the art will appreciate that known in the art WSS devices often include the per-channel variable attenuation capability by design, which can be advantageously used by the present invention.

Figure 5:
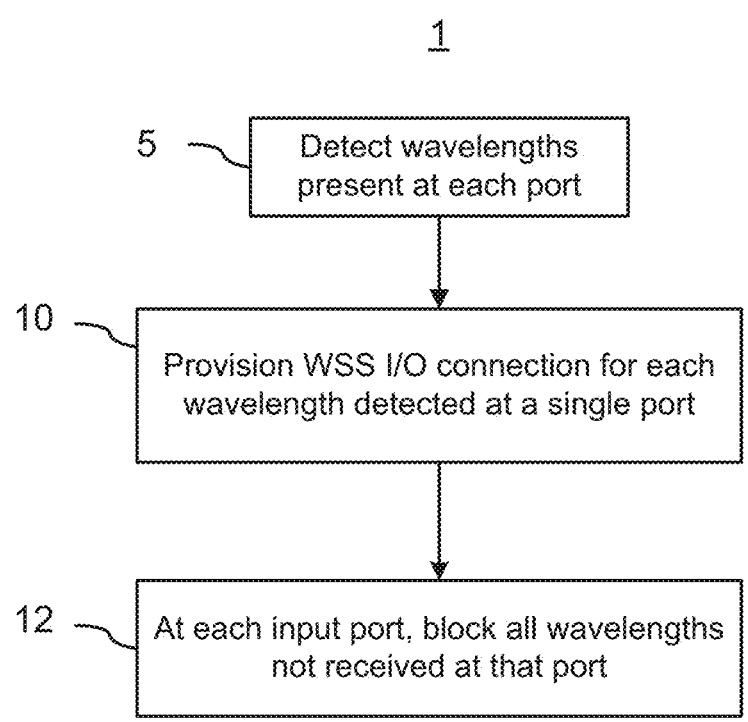
FIG. 5 is a general flowchart of the method for auto-configuration of a WSS device according to the present invention.
Figure 6:
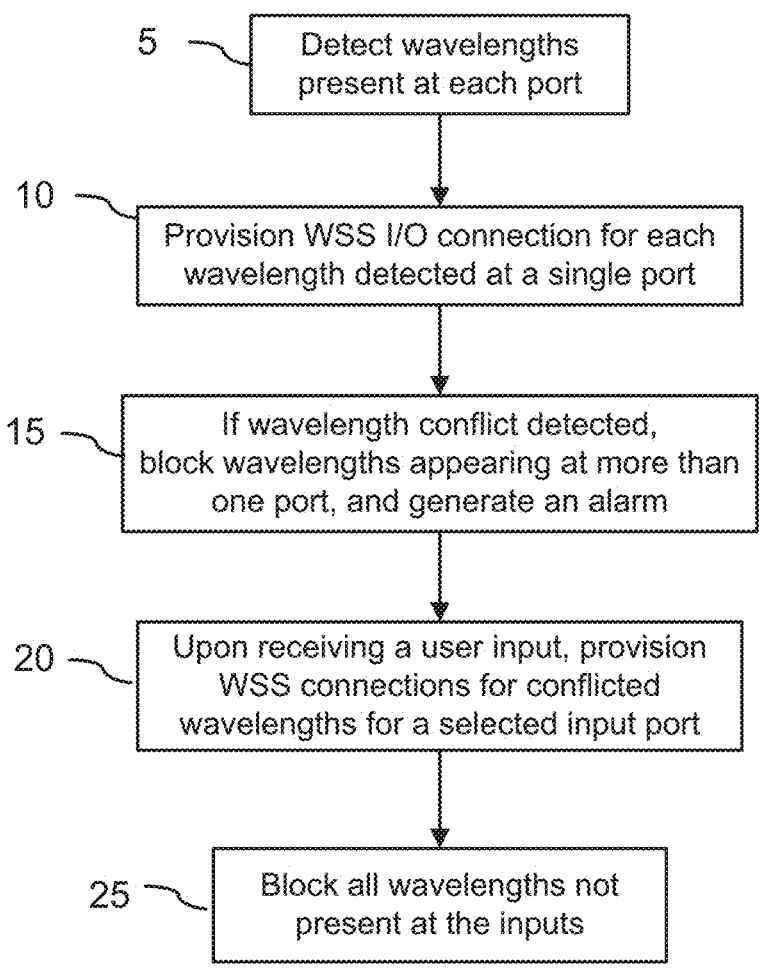
FIG. 6 is a flowchart of one embodiment of the method for auto-configuration of a WSS device according to the present invention.
Figure 7:
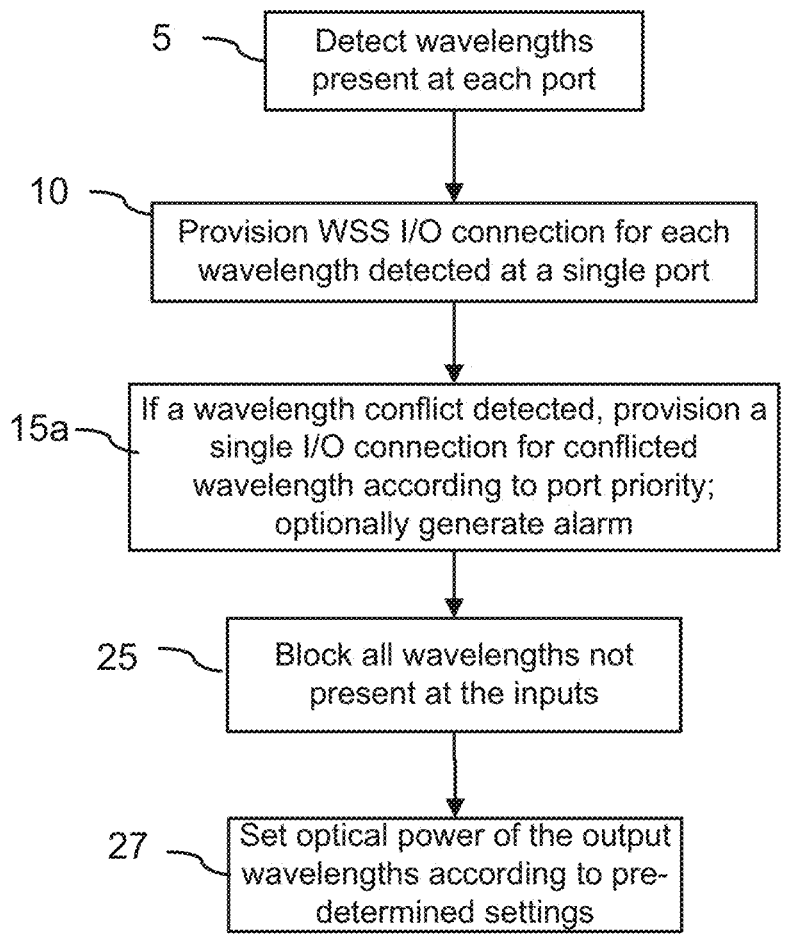
FIG. 7 is a flowchart of another embodiment of the method for auto-configuration of a WSS device according to the present invention.

The method for automatic self-configuration of a WSS device, which may also be used as an automated start-up procedure thereof, will now be described with reference to FIGS. 5-7 illustrating steps of the method in various embodiments thereof, and also with reference to the controlled WSS device 100 of FIG. 1 by way of example; it will be appreciated that the method steps described hereinbelow are equally applicable to the WSS devices 210, 310 in the ROADM Degree 1, 2 modules illustrated in FIG. 4.

Referring first to FIG. 5, there is shown a flowchart illustrating basic steps of the method in one embodiment (1) thereof. As illustrated, the method may include the following general steps:

At step 5, one or more OCMs, such as the OCM 125 in the embodiment of FIG. 1 or FIG. 3, or the plurality of OCMs in the embodiment of FIG. 2, are used to detect which of the supported wavelengths $\lambda_i$ are received at each of the input optical ports of the WSS 110. The WSS controller 115 collects resulting information, for example in the form of listings of wavelengths determined to be present at each of the n input ports 111 of the WSS 110.

At step 10, the WSS controller 115 operates the WSS device 110 so as to selectively provision optical connections from respective input optical ports 111 to the output optical port 112 for those of the supported wavelengths $\lambda_i$ that are received at one and only one of the input optical ports 11 of the WSS device.

At step 12, connections between the input optical ports 111 and the output optical port 112 at those of the supported wavelengths that are not received at any of the input optical ports, are blocked within the WSS 110. In one preferred embodiment, the WSS controller 115 may operate the WSS 110 so as to block, for each of the input ports 111, all supported wavelengths that are not received at that port.

The WSS controller 115 maybe programmed in such a way that the aforedescribed steps 110 are performed as an automated start-up procedure when the controlled WSS device 100 is first connected into a network. In some embodiments, the WSS 110 may be initially provided in a default state wherein the connections between each of the input ports 111 and the output port 112 are blocked for all supported wavelength; in that case, step 112 is not required, and the WSS controller 115 will only need to signal to the WSS 110, which of the received wavelengths are to be "unblocked" at each of the input ports 11 to couple to the output port 112.

In some cases, a same supported wavelength may be present at two or more of the input ports 111, indicating a wavelength conflict which needs to be resolved. Such a wavelength conflict may be resolved by either temporally blocking the wavelength's passage to the output port from each of the input ports where it is detected and awaiting a user input resolving the conflict, or, in embodiments wherein the input ports are assigned priorities which are made known to the WSS controller, by selecting one of said input ports for opening a path therefrom to the output port for the wavelength in conflict according to the ports priorities, while blocking the passage of the conflicting wavelength in the WSS 110 from all other input ports 111. The auto-configuration algorithm that is carried out by the WSS controller may also be pre-configured to favor one or more of the input ports, for example, a port that is being used as the 'express' port in the ROADM node configuration such as illustrated in FIG. 4. If a conflicting wavelength has been detected on one such favored port and one or more non-favoured, e.g. "add", ports, the method will automatically configure the WSS to allow the wavelength to pass from the favored input port to the common output port, and block the wavelength on all other ports. In one embodiment, if a conflicting wavelength has been detected on more than one favored port, the method will block the conflicting wavelength on all input ports, complete the algorithm, and notify the operator of the conflict.

Referring more specifically to FIG. 6, there is illustrates an embodiment 2 of the method wherein the controlled WSS device 100 is programmed to perform the following steps:

At step 5, the WSS controller 115 obtains information from the one or more OCMs 125 about the supported wavelengths that are present at each of the input ports 111 of the WSS 110. The WSS controller 115 is programmed to identify wavelength conflicts by verifying if any of the detected wavelengths is present at two or more of the input ports 111. For each of the wavelengths which presence has been detected by the CPM 125 at one and only one of the input ports 111, the WSS controller 115 provisions at step 10 an optical connection from an input port 111, wherein said wavelength has been detected, to the output port 112 (the I/O connection).

If in step 15 the WSS controller 115 determines that a wavelength conflict is present, the WSS controller signals to the WSS 110 to block the conflicting wavelength or wavelengths in the WSS 110 from reaching the output port 112 from any of the input ports 111, including the input ports where their presence have been detected by the OCM 125. Optionally, an alarm may be generated at this point that signals that an external intervention is required to resolve a conflict.

At step 20, upon receiving a user input indicating which of the input ports 111 receiving the conflicting wavelength should be coupled at said wavelength to the output port 112, the WSS controller 115 operates the WSS 110 so as to optically couple the selected by the user input port to the output port 125 for the conflicted wavelength. In an optional step 25, the WSS controller 115 may operate the WSS 110 to block optical connections between each of the input ports 111 and the output port 112 at those of the supported wavelengths that were not detected as present at a corresponding input port.

With reference to FIG. 7, an embodiment of the method is illustrated wherein the input ports 111 are assigned priorities, which are known to the WSS controller 115; for example, the WSS controller 115 may include, or be operatively coupled to, a memory element wherein the port priority information is saved, such as in a look-up table. For example, those of the input ports 111 that are designated as "add" ports, see FIG. 4, may have higher priority associated therewith than the "express" input port, or vice versa depending on a particular system design. Furthermore, some or all of the "add" ports may also have differing priorities assigned thereto. Accordingly, in the embodiment of the method illustrated in FIG. 7, step 10 of provisioning I/O connections for each of the wavelengths that is detected at one and only one of the input ports 111, is accompanied by step 15a, wherein the WSS controller 115 identifies a wavelength $\lambda_k$ that is present at two or more of the input ports 111, thereby detecting a wavelength conflict, and, based on the port priority information that is saved in the memory of the WSS controller, identifies among the input ports 111 receiving said wavelength $\lambda_k$ the port that has the highest priority among all the ports 111 at which the wavelength $\lambda_k$ has been detected, and then provisions an I/O connection at the wavelength $\lambda_k$ between the output port 112 and the identified input port 111 with the comparatively highest priority, while blocking the passage of said wavelength from all other input ports.

In an optional step 27, the WSS controller 115 may operate the WSS 110 so as to set the output optical power of each of the supported wavelengths that reach the output port 112 according to pre-determined power settings. In doing so, the WSS controller 115 may utilize the per-wavelengths optical power readings obtained from the OCM 125, and per-wavelength optical attenuation capabilities that many types of known WSS devices possess. This step may also be optionally perfumed in the embodiments of FIGS. 5 and 6.

Figure 8:
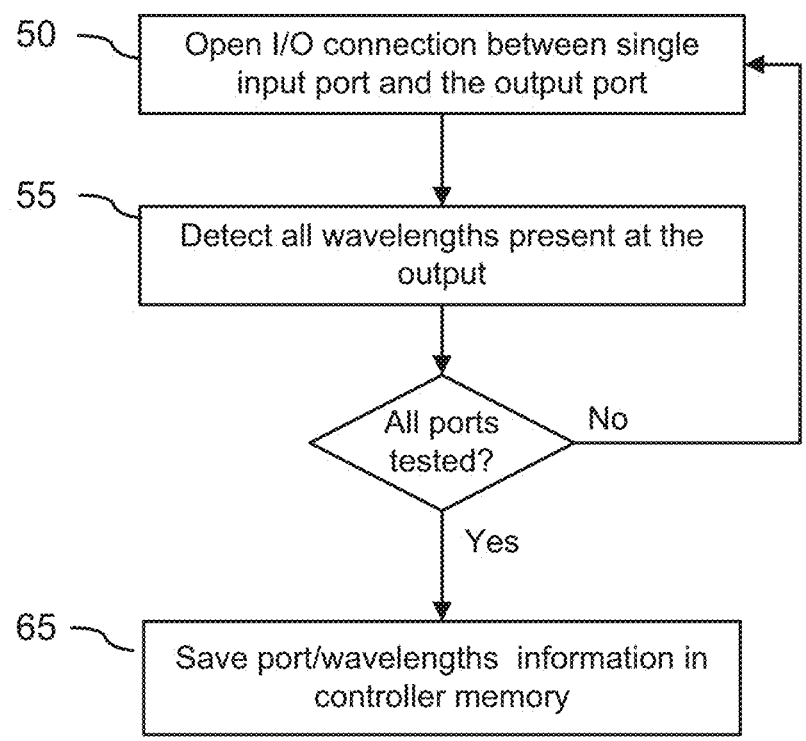
FIG. 8 is a flowchart of a process for detecting the presence of supported wavelengths at each of the input ports of the WSS device using an OCM coupled to the output port thereof.

The method of the present invention requires that the WSS device 100 has the capability of detecting which of the supported wavelengths are present at each of the input ports 111, or receives this information elsewhere. This can be easily accomplished in the embodiments wherein the WSS device 100 has one or more OCMs connected in a way that enables monitoring of the input ports 111 individually, for example as shown in FIGS. 2 and 3. However, it may be advantageous to have a single OCM connected at the output of the WSS 110, as illustrated in FIG. 1; apart from requiring less hardware, this also enables the direct monitoring of the optical power in each of the wavelength channels at the output of the WSS 110, thereby facilitating the setting of the output power levels for each of the wavelengths. In such embodiments, the step of detecting the wavelengths that are present at each of the input ports 111 of the WSS 110, i.e. step 5 in FIGS. 5-7, may be carried out as illustrated in FIG. 8. In this embodiment, the WSS controller 115 is programmed to perform, at the start of the WSS auto-configuration procedure, the following steps:

At step 50, the WSS controller 115 directs the WSS 110, i.e. by sending a suitable control signal to the control port thereof, to block connections between the output port 112 and all but one of the input ports 111 at all of the supported wavelengths, so as to open an optical path to the output port from a single selected input port. At step 55, the OCM 125 is operated so as to detect which of the supported wavelengths are present at the output port 112, thereby establishing the wavelength channels that are present at the selected input port. Steps 50 and 55 are then repeated each time selecting a different input port to connect to the output port, until all input ports are tested, while saving thereby obtained port/wavelength information in the controller memory.

Figure 9:
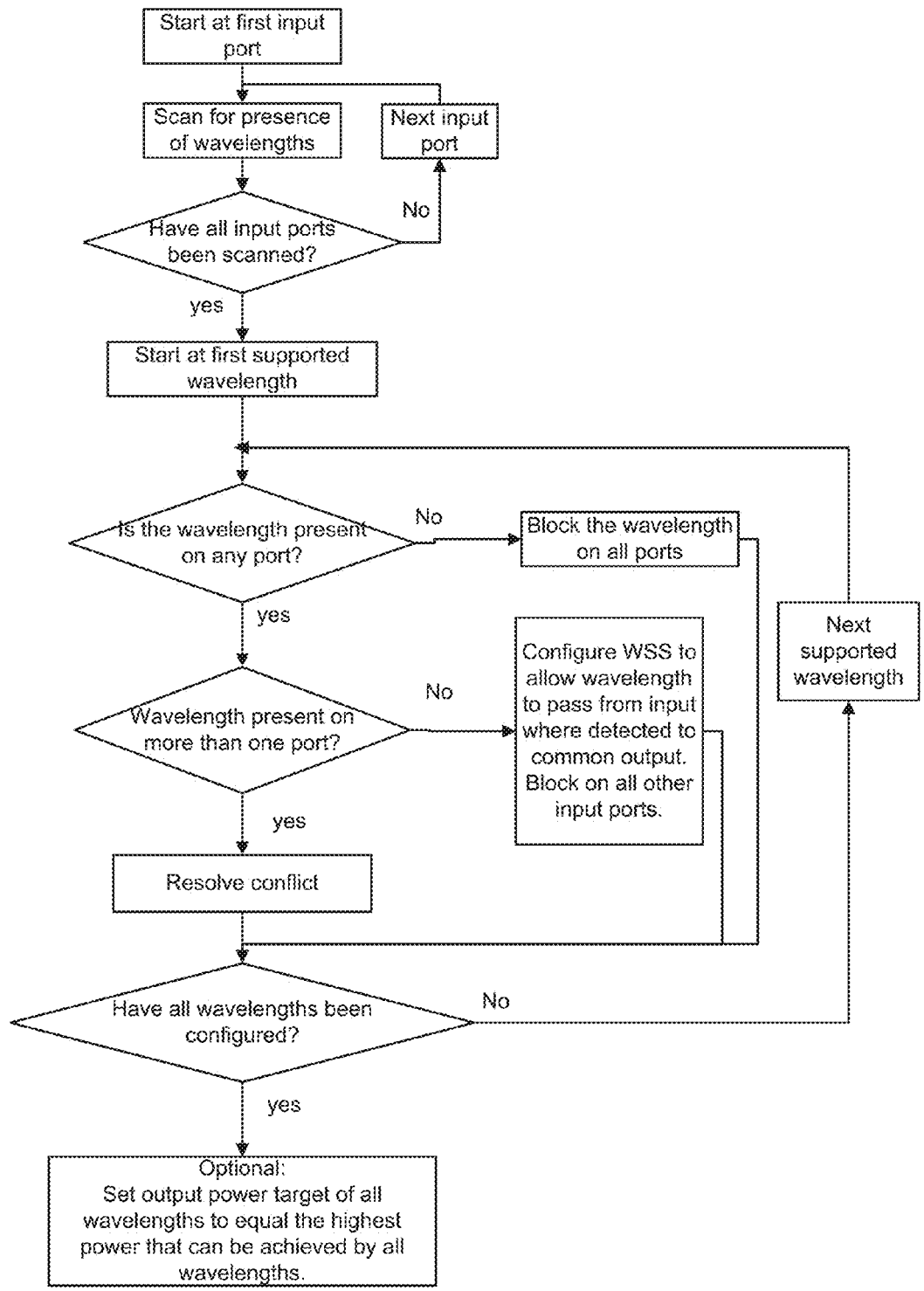
FIG. 9 is a flowchart of one implementation of the method for auto-configuration of a WSS device according to an embodiment of the present invention.
Figure 10:
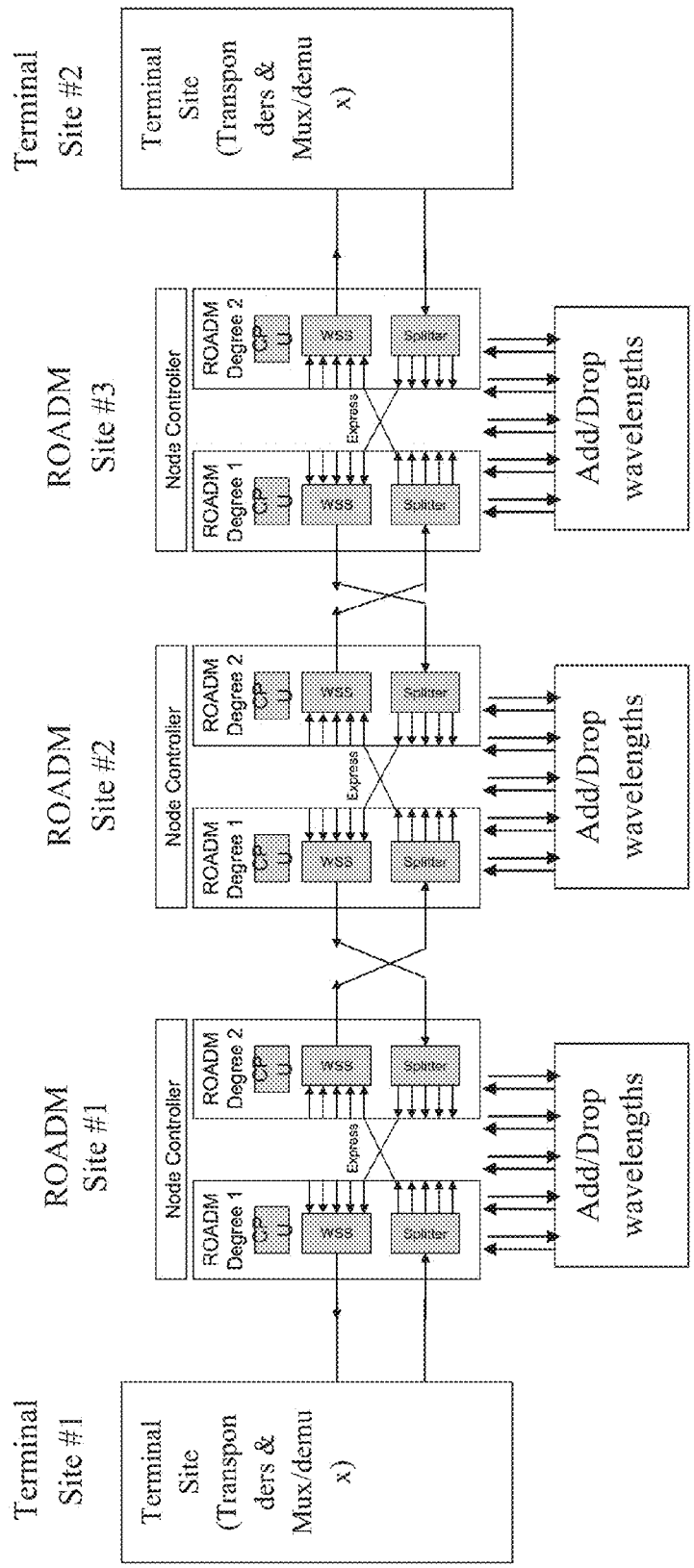
FIG. 10 is a block diagram of an exemplary linear section of a WDM network wherein the method of the present invention may be applied.

It will be appreciated that the basic steps of the method of the present invention in various embodiments thereof as described hereinabove with reference to FIGS. 5-8 may be implemented using the WSS controller 115 or the like in a variety of ways, one of which is illustrated in FIG. 9, showing a flowchart of the logic that the WSS controller 115 may be programmed to carry out during the self-configuring of the WSS 100.

The aforedescribed method for auto-configuration of the WSS device in an optical network provides means by which a ROADM node comprised of one or more WSS devices, such as that illustrated in FIG. 4, can automatically configure itself based on the detection of wavelengths (channels) present at one or more inputs into the node. Except may be for initiating it, the method requires no user interaction to complete the WSS configuration and therefore simplifies, and reduces the amount of, user interaction required in order to configure the ROADM. The method may be initiated by software command to the node, direct physical input from an operator, such as a pushbutton or switch, or any other suitable means as would be known in the art.

Configuration of the ROADM node may include the configuration of some or all wavelength paths through the node, as well as the configuration of some or all optical output power levels of wavelengths at the output of the node.

Although many architectures of a ROADM node are possible, FIG. 4 illustrates a common architecture wherein a WSS (210, 310) is used to add wavelengths to a ROADM degree, and a power splitter (230, 330) is used to drop wavelengths at the node. Other possibilities include use of a WSS for both adding and dropping, or a WSS for dropping and an optical power coupler or a fixed Wavelength Division Multiplexer for adding. Distribution of control functions in the node can vary between centralization of these functions for all 'degrees' on a single control element, to increasing distribution of these functions across other CPUs, or controllers, within the node, which may physically exist on diverse printed circuit board assemblies within the domain of the same logical node. By way of example, FIG. 4 illustrates a node control architecture with a common node controller 205 with a processor 255, where control functions that span diverse physical elements within the node are centralized, and separate WSS controllers 215, 315 for each degree of the ROADM node. In other embodiments, the node controller 205 may assume functions performed by the WSS controllers 215, 315.

One aspect of the invention provides an automated start-up procedure for a multi-degree ROADM node in an optical network utilizing WSS devices for adding wavelengths onto the network, such as the 2-degree ROADM node illustrated in FIG. 4. Although not shown in FIG. 4, the method utilizes OCMs coupled to the each of the WSS devices as described hereinabove for detecting the presence of supported wavelength at each of the input ports of the WSSs, and optionally for monitoring the optical power in each of the wavelengths appearing at the output port of the respective WSS.

Generally, the method may include performing the aforedescribed WSS auto-configuration procedures, see FIGS. 5-8, for each of the WSS devices used to add channels to the network, such as the WSS devices 210 and 310 of the node of FIG. 4. In particular, the method in one aspect thereof may include all or some of the following features:

a) at each degree of the ROADM node, the input ports 211, 311 to the WSS device 210, 310 may be designated as Add or Express inputs, with the output port 212, 312 designated as Common;

b) wavelengths (channels) that are not detected on the Add or Express inputs to a given node degree are blocked;

c) any wavelength whose presence is detected at one and only one Add or Express input is switched to the Common output port.

d) any wavelength whose presence is detected on both an Express input and an Add input of the same degree are assumed to be added at the node. Therefore the wavelength is blocked on the express input, and routed from the Add input to the Common output, such as from one of the "Add" input ports 311 to the output port 312 of the WSS 310.

e) any wavelength whose presence is detected at more than one "Add" input, or more than one Express input for nodes with the number of degrees greater than 2, is blocked until user intervention resolves the conflict, or resolved automatically if one of the "Add" input ports receiving the wavelengths has a comparatively higher priority assigned thereto.

Note that blocking a supported wavelength when it is not detected on an Add or Express port of the same degree of the ROADM node is advantageous as it enables to avoid potential wavelength conflicts downstream at another node in the network. Furthermore, blocking of the wavelength that is not detected at the WSS inputs allows the corresponding channel to be added in a graceful, controlled manner in the future. For example, it would not be unusual for a technician to plug in a transponder of a particular wavelength and connect it up to the network. If that wavelength were unblocked through all the switching elements in the network, there are a number of potential problems that could arise, such as conflicts with other channels in the network or a sudden power transient.

A wavelength is generally considered to be "blocked" at a selected input port of the WSS, when the attenuation it experiences on the way from this input port to the output port exceeds a pre-determined value, typically 20 dB or greater, or as specified by the system design. This function is typically implemented within the WSS element itself, as WSS devices typically support wavelength power control as well as the switching between optical ports. However, this does not necessarily have to be the case: A WSS could be used to perform the switching, and a separate suitable device could perform the wavelength power control, although this may be less efficient and more costly.

The auto-configuration procedure of the present invention in one of the aforedescribed or similar embodiments thereof may be advantageously utilized in various network scenarios, such as at a first start-up of the network or a section thereof, or when replacing one or more components of a ROADM node, such as the WSS device itself, or periodically during the operation, etc.

Turning now to FIG. 9, there is schematically illustrated a portion of a WDM network in the form of a linear chain of 2-degree ROADM nodes or sites connected by fiber-optic links between two terminal sides wherein express WDM optical signals are terminated, i.e. generated and converted into electrical signals. The chain is bi-directional, including two substantially identical one-directional chains utilizing a fiber pair formed of two optical fibers for transmitting signals in the opposite directions. By way of example, a self-configuration start-up procedure for such a network can be performed using features of the present invention as described hereinbelow. For clarity of the description only, it is assumed hereinbelow that the ROADM chain of FIG. 9 is being turned up from left to right in one direction of the fibre pair, which is referred to as "east-bound", then right to left for the other, i.e. the "west-bound", direction. The term "operator" used hereinbelow may refer to a person, group of persons, or to a suitable software running on one or more processors, which may be either co-located at a same control site, or distributed between sites and communicating over a control layer of the network, or otherwise.

A) First, at terminal site #1, operator ensures that all terminal equipment, such as transponders, are connected so that all desired DWDM wavelengths are present on the output fibre that is facing ROADM site #1, as indicated in the figure by a right-directed arrow. Operator proceeds to ROADM site #1

B) At ROADM site #1, operator ensures that all desired add/drop WDM wavelengths are connected and present, at least at ROADM degree 2, then activates the self configuration algorithm of the WSS on ROADM degree 2, as described hereinabove. If no internally unresolvable wavelength conflicts exist between "eastbound" express wavelengths and eastbound add wavelengths, then operator proceeds to ROADM site #2. Else, conflicts on the eastbound fibre need to be manually resolved.

C) At ROADM site #2 and #3: Repeat same procedure as at ROADM site #1.

D) Repeat steps (A)-(C) starting at terminal site #2 and working westbound at ROADM sites 3, 2, then 1, sequentially performing the self-configuration procedure for the WSS devices employed to receive the westbound traffic.

The invention has been described hereinabove with reference to specific embodiments as illustrated in the accompanying drawings. Although the auto-configuration method in its various embodiments has been described hereinabove primarily (but not exclusively) as initiated by a discrete user intervention, or by a software-imitated control signal at a system start-up. Alternatively, the method may be applied as a continuous control algorithm, where presence of wavelengths is continuously monitored, and the WSS device configuration changed automatically as the input conditions, i.e. wavelengths present, change.

It should be understood that each of the preceding embodiments of the present invention may utilize a portion of another embodiment, and many other embodiments and variations of the method may be envisioned within the scope of the present invention. An ordinary person in the art would be able to construct such embodiments without undue experimentation in light of the present disclosure.

We claim:
1. A method for configuring a wavelength selective switch (WSS) in a wavelength division multiplexed (WDM) optical network, the method comprising:
detecting, by a controller in communication with at least one optical channel monitor (OCM), a presence or absence of supported wavelengths at each of a plurality of input ports of the WSS,
the controller being located in a first location within the WDM optical network and the WSS being located in a second, different location within the WDM optical network; and
configuring, by the controller, the WSS by selectively provisioning or blocking optical connections within the WSS between each of the plurality of input ports and an output port such that:
optical connections between each of the plurality of input ports and the output port at any of the supported wavelengths that are not detected at any of the plurality of input ports are blocked by the WSS by ensuring that optical loss between each of the plurality of input ports and the output port exceeds a pre-determined value at the supported wavelengths; and
any supported wavelength, of the supported wavelengths, whose presence is detected by the at least one OCM at a single one of the plurality of input ports is switched to the output port.

2. The method of claim 1, further comprising:
sending control signals to a control port of the WSS to block at least one of the supported wavelengths, whose presence is detected at more than one of the plurality of input ports, from reaching the output port.

3. The method of claim 1, further comprising:
sending control signals to a control port of the WSS to block at least one of the supported wavelengths, whose presence is detected at more than one of the plurality of input ports, from reaching the output port from all but one of the plurality of input ports, and to direct the at least one of the supported wavelengths to the output port from one of the plurality of input ports receiving the at least one of the supported wavelengths.

4. The method of claim 1, further comprising:
receiving information, from the at least one OCM, identifying which of the supported wavelengths is present at one or more of the plurality of input ports;
determining, based on the information, which of the supported wavelengths is present at one of the plurality of input ports; and
provisioning, at each of the determined wavelengths, an optical connection in the WSS between an input port, of that plurality of input ports, and the output port.

5. The method of claim 4, further comprising:
identifying, based on the information received from the at least one OCM, a wavelength conflict, wherein one of the supported wavelengths is detected at two or more of the plurality of input ports.

6. The method of claim 5, further comprising:
temporarily blocking optical connections between each of the plurality of input ports and the output port at the one of the supported wavelengths for which the wavelength conflict is identified.

7. The method of claim 6, further comprising:
generating a wavelength conflict alarm when a presence of the one of the supported wavelengths at the two or more of the plurality of input ports is detected by the at least one OCM; and provisioning, based on an input resolving the wavelength conflict, an optical connection, at the one of the supported wavelengths for which the wavelength conflict was identified, between the output port and one of the two or more of the plurality of input ports receiving said wavelength in accordance with the input.

8. The method of claim 5 wherein
the two or more of the plurality of input ports are assigned different priorities, and
the method further comprises:
provisioning an optical connection in the WSS, at the one of the supported wavelengths, between the output port and a selected one of the two or more of the plurality of input ports.

9. The method of claim 1, wherein a supported wavelength whose presence is detected by the at least one OCM at more than one input port, of the plurality of input ports, is switched to the output port from an input port, of the plurality of input ports, that has a particular priority value.

10. The method of claim 1, wherein detecting the presence or absence of the supported wavelengths at each of the plurality of input ports of the WSS includes:
detecting the presence or absence of the supported wavelengths at each of a plurality of input ports of more than one WSS.

11. A controller for configuring a wavelength selective switch (WSS) in a wavelength division multiplexed (WDM) optical network, the controller being to:
detect, based on communication with at least one optical channel monitor (OCM), a presence or absence of supported wavelengths at each of a plurality of input ports of the WSS,
the controller being located in a first location within the WDM optical network and the WSS being located in a second, different location within the WDM optical network; and
configure the WSS by selectively provisioning or blocking optical connections within the WSS between each of the plurality of input ports and an output port such that:
optical connections between each of the plurality of input ports and the output port at any of the supported wavelengths that are not detected at any of the plurality of input ports are blocked by the WSS by ensuring that optical loss between each of the plurality of input ports and the output port exceeds a pre-determined value at the supported wavelengths; and
any supported wavelength, of the supported wavelengths, whose presence is detected by the at least one OCM at a single one of the plurality of input ports is switched to the output port.

12. The controller of claim 11, where the controller is further to:
send control signals to a control port of the WSS to block at least one of the supported wavelengths, whose presence is detected at more than one of the plurality of input ports, from reaching the output port.

13. The controller of claim 11, where the controller is further to:
send control signals to a control port of the WSS to block at least one of the supported wavelengths, whose presence is detected at more than one of the plurality of input ports, from reaching the output port from all but one of the plurality of input ports, and to direct the at least one of the supported wavelengths to the output port from one of the plurality of input ports receiving the at least one of the supported wavelengths.

14. The controller of claim 11, where the controller is further to:
receive information, from the at least one OCM, identifying which of the supported wavelengths is present at one or more of the plurality of input ports;
determine, based on the information, which of the supported wavelengths is present at one of the plurality of input ports; and
provision, at each of the determined wavelengths, an optical connection in the WSS between an input port, of that plurality of input ports, and the output port.

15. The controller of claim 14, where the controller is further to:
identify, based on the information received from the at least one OCM, a wavelength conflict, wherein one of the supported wavelengths is detected at two or more of the plurality of input ports.

16. The controller of claim 15, where the controller is further to:
temporarily block optical connections between each of the plurality of input ports and the output port at the one of the supported wavelengths for which the wavelength conflict is identified.

17. The controller of claim 16, where the controller is further to:
generate a wavelength conflict alarm when a presence of the one of the supported wavelengths at the two or more of the plurality of input ports is detected by the at least one OCM; and
provision, based on an input resolving the wavelength conflict, an optical connection, at the one of the supported wavelengths for which the wavelength conflict was identified, between the output port and one of the two or more of the plurality of input ports receiving said wavelength in accordance with the input.

18. The controller of claim 15, wherein
the two or more of the plurality of input ports are assigned different priorities, and
the controller is further to:
provision an optical connection in the WSS, at the one of the supported wavelengths, between the output port and a selected one of the two or more of the plurality of input ports.

19. The controller of claim 11, wherein a supported wavelength whose presence is detected by the at least one OCM at more than one input port, of the plurality of input ports, is switched to the output port from an input port, of the plurality of input ports, that has a particular priority value.

20. The controller of claim 11, wherein the controller, when detecting the presence or absence of the supported wavelengths at each of the plurality of input ports of the WSS, is to:
detect the presence or absence of the supported wavelengths at each of a plurality of input ports of more than one WSS.

* * * * *